United States Patent
Shimizu et al.

(10) Patent No.: US 8,218,525 B2
(45) Date of Patent: Jul. 10, 2012

(54) COMMUNICATION SYSTEM

(75) Inventors: Hirotoshi Shimizu, Kawasaki (JP); Yoji Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 294 days.

(21) Appl. No.: 12/780,259

(22) Filed: May 14, 2010

(65) Prior Publication Data

US 2010/0296388 A1    Nov. 25, 2010

(30) Foreign Application Priority Data

May 21, 2009  (JP) ................. 2009-123442

(51) Int. Cl.
 *H04J 3/24* (2006.01)
(52) U.S. Cl. ........................ 370/349; 370/232
(58) Field of Classification Search .......... 370/389, 370/349, 232, 253
See application file for complete search history.

(56) References Cited

U.S. PATENT DOCUMENTS

| | | |
|---|---|---|
| 6,694,469 B1* | 2/2004 | Jalali et al. ............... 714/748 |
| 7,509,555 B2* | 3/2009 | Ishizaki ................... 714/748 |
| 7,881,660 B2 | 2/2011 | Takeda et al. |
| 2005/0053038 A1 | 3/2005 | Kimura |
| 2007/0183321 A1 | 8/2007 | Takeda et al. |
| 2008/0026758 A1 | 1/2008 | Murakami |
| 2008/0049813 A1 | 2/2008 | Kurose et al. |
| 2009/0235138 A1* | 9/2009 | Chang et al. ............ 714/748 |
| 2010/0003990 A1 | 1/2010 | Suemitsu et al. |

FOREIGN PATENT DOCUMENTS

| | | |
|---|---|---|
| EP | 1 883 191 | 1/2008 |
| EP | 2 088 790 | 8/2009 |
| JP | 2005-86304 | 3/2005 |
| JP | 2008-78784 | 4/2008 |
| JP | 2008-295070 | 12/2008 |
| WO | 2008/056426 | 5/2008 |

OTHER PUBLICATIONS

Extended European search report dated Nov. 19, 2010 for corresponding European Application No. EP 10 16 3004.

* cited by examiner

*Primary Examiner* — Brenda H Pham
(74) *Attorney, Agent, or Firm* — Katten Muchin Rosenman LLP

(57) ABSTRACT

A communication system includes: a base station; and a mobile terminal for sequentially sending a plurality of data packets at a designated data transfer rate and information of velocity of the mobile terminal to the base station; the base station including: a receiver for receiving the data packet and the velocity information; a transmitter for transmitting a request to the mobile terminal to resend a data packet upon detection of an error in the data packet previously received; and a reply controller for setting number of requests to be repetitively sent in accordance with the velocity information and, after the number of requests have been sent, sending command to change the designated data transfer rate to the mobile terminal.

11 Claims, 16 Drawing Sheets

FIG. 6

| VELOCITY OF TRAVEL | VELOCITY INFORMATION |
|---|---|
| LOW: 0 TO 40 K | 00 |
| MEDIUM: 40 TO 140 K | 01 |
| HIGH: 140 K AND HIGHER | 10 |
| RESERVED | 11 |

| ACK/NACK | CQI | PROCESS NUMBER | DECODING PARAMETER | VELOCITY INFORMATION | OTHERS |

FIG. 7A

| NACK | 30 | #2 | 10 | 10 | TRANSMIT BLOCK SET SIZE AND RV PARAMETER |

1 TO #6: PROCESS DATA
NEW: NEW DATA
RET: DATA IN RETRANSMISSION

| #1 NEW | #2 RET | #3 NEW | #4 NEW | #5 NEW | #6 NEW |

FIG. 9A

| PROCESS NUMBER | NUMBER OF PERFORMED RETRANSMISSION REQUESTS | MAXIMUM NUMBER OF REQUESTS |
|---|---|---|
| #1 | 0 | 4 |
| #2 | 4 | |
| #3 | 0 | |
| #4 | 0 | |
| #5 | 0 | |
| #6 | 0 | |

FIG. 9B

| PROCESS NUMBER | NUMBER OF PERFORMED RETRANSMISSION REQUESTS | MAXIMUM NUMBER OF REQUESTS |
|---|---|---|
| #1 | 0 | 2 |
| #2 | 4 | |
| #3 | 0 | |
| #4 | 0 | |
| #5 | 0 | |
| #6 | 0 | |

FIG. 14

| FRAME NUMBER | PROCESS NUMBER | NUMBER OF PERFORMED RETRANSMISSION REQUESTS | THROUGHPUT [Mbps] |
|---|---|---|---|
| 1 | 1 | 0 | 3 |
| 2 | 2 | 0 | 3 |
| 3 | 3 | 0 | 3 |
| 4 | 4 | 0 | 3 |
| 5 | 5 | 0 | 3 |
| 6 | 6 | 0 | 3 |
| 7 | 1 | 0 | 3 |
| 8 | 2 | 0 | 0 |
| 9 | 2 | 1 | 0 |
| 10 | 2 | 2 | 0 |
| 11 | 2 | 3 | 0 |
| 12 | 2 | 4 | 0 |
| 13 | 2 | 0 | 1 |
| 14 | 3 | 0 | 2 |
| 15 | 4 | 0 | 3 |
| 16 | 5 | 0 | 3 |
| 17 | 6 | 0 | 3 |
| 18 | 1 | 0 | 3 |
| ⋮ | ⋮ | ⋮ | ⋮ |

FIG. 15

| FRAME NUMBER | PROCESS NUMBER | NUMBER OF PERFORMED RETRANSMISSION REQUESTS | THROUGHPUT [Mbps] |
|---|---|---|---|
| 1 | 1 | 0 | 3 |
| 2 | 2 | 0 | 3 |
| 3 | 3 | 0 | 3 |
| 4 | 4 | 0 | 3 |
| 5 | 5 | 0 | 3 |
| 6 | 6 | 0 | 3 |
| 7 | 1 | 0 | 3 |
| 8 | 2 | 0 | 0 |
| 9 | 2 | 1 | 0 |
| 10 | 2 | 2 | 0 |
| 11 | 2 | 0 | 1 |
| 12 | 3 | 0 | 2 |
| 13 | 4 | 0 | 3 |
| 14 | 5 | 0 | 3 |
| 15 | 6 | 0 | 3 |
| 16 | 1 | 0 | 3 |
| 17 | 2 | 0 | 3 |
| 18 | 3 | 0 | 3 |
| ⋮ | ⋮ | ⋮ | ⋮ |

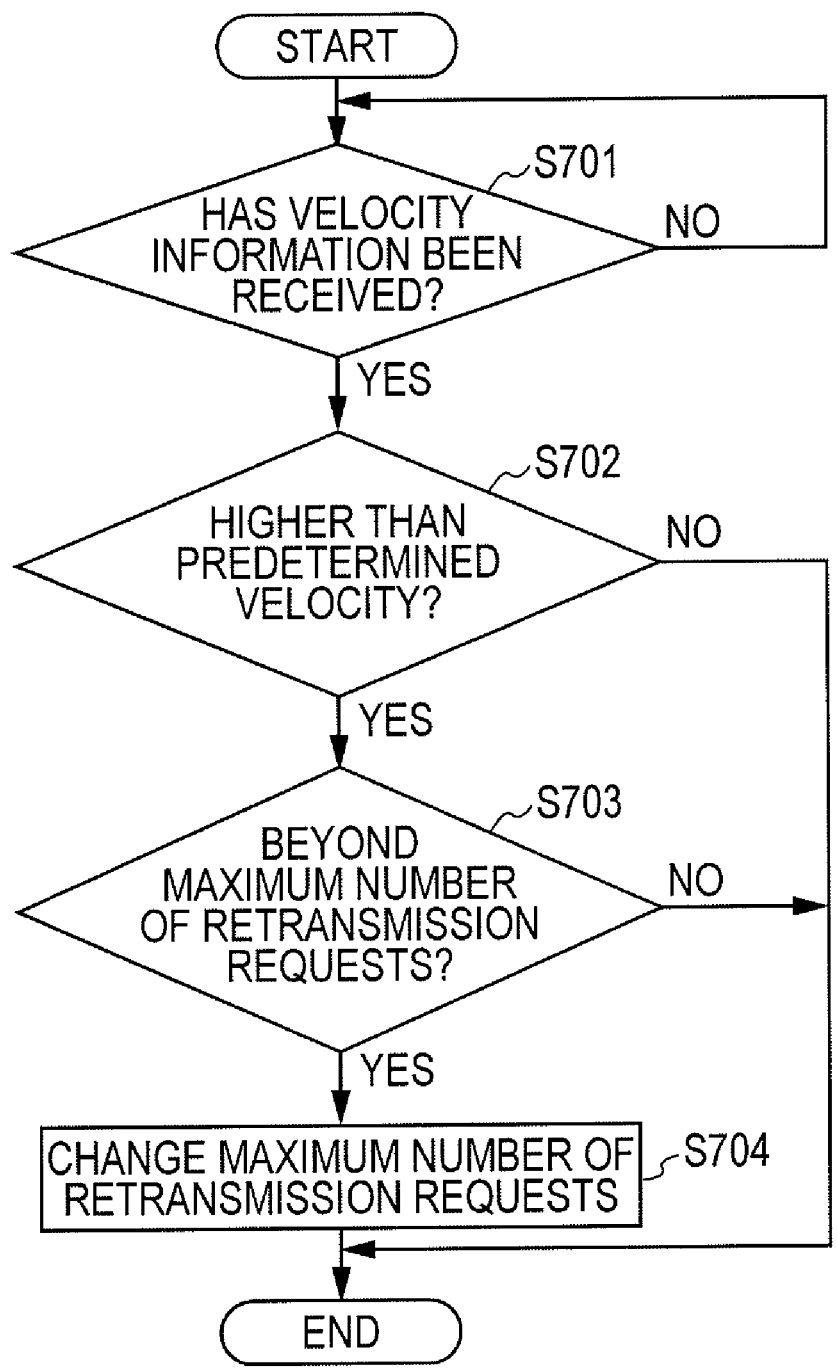

COMMUNICATION SYSTEM

CROSS-REFERENCE TO RELATED APPLICATION

This application is based upon and claims the benefit of priority of the prior Japanese Patent Application No. 2009-123442 filed on May 21, 2009, the entire contents of which are incorporated herein by reference.

FIELD

The embodiments discussed herein are related to communication systems.

BACKGROUND

Hitherto, retransmission methods such as hybrid automatic repeat request (HARQ) have been known in which a base station performs retransmission processing on a packet to a mobile terminal.

For example, when a packet received by a mobile terminal contains an errors that are difficult for the mobile terminal to correct the errors, the base station implementing HARQ may retransmit the packet or transmit a redundancy bit that has not been transmitted with puncturing. The term "puncturing" refers to transmission of thinned-out information.

Then, for example, the mobile terminal implementing HARQ may hold the packet containing errors. When the mobile terminal receives the packet or redundancy bit transmitted by the retransmission processing from the base station, the mobile terminal may synthesize the received packet or redundancy bit and the held packet and correct the errors. For example, the synthesis of the held packet and the received redundancy bit by the mobile terminal can improve the error correction performance for the held packet to correct the errors.

According to the retransmission method, a base station uses the transmission condition used for the first transmission to perform the retransmission processing. For example, a base station may use the equal transmission power to the transmission power used for the first transmission to perform the retransmission processing. Generally, as the transmission power increases, the amount of error decreases in the packet transmitted with the transmission power and received by a mobile terminal. As the transmission power decreases, the amount of error increases in the packet transmitted with the transmission power and received by a mobile terminal.

It has been known that fading and rapid changes in radio-wave propagation state occur while a mobile terminal is moving at a high velocity. Methods have also been known in which a radio parameter is changed in accordance with quality of service (QoS). Those methods are disclosed in Japanese Laid-open Patent Publication No. 2005-86304 and Japanese Laid-open Patent Publication No. 2008-295070.

However, those retransmission methods in the past may repeat ineffective retransmission processing. More specifically, according to a retransmission method in the past, while a mobile terminal is moving at a high velocity and when the radio-wave propagation state rapidly deteriorates, even repeated retransmission processing on the target packet may not allow the mobile terminal to fully correct errors in the packet and does not result in the error correction. In other words, the retransmission processing is performed ineffectively.

For example, the retransmission method may use the transmission power used for the first transmission to repeat the retransmission processing even when the radio-wave propagation state is deteriorated. However, the retransmitted packet received by the mobile terminal and transmitted by the retransmission processing may contain many errors that may be difficult for the mobile terminal to fully correct like the packet received by the mobile terminal in the first transmission.

For example, when the radio-wave propagation state of a mobile terminal rapidly deteriorates, errors may occur. In such a case however, the mobile terminal may not fully correct the errors even with the redundancy bit that has not been transmitted with puncturing, retransmitted by the base station and received by the mobile terminal.

SUMMARY

According to an aspect of the embodiment, a communication system includes: a base station; and a mobile terminal for sequentially sending a plurality of data packets at a designated data transfer rate and information of velocity of the mobile terminal to the base station; the base station comprising: a receiver for receiving the data packet and the velocity information; a transmitter for transmitting a request to the mobile terminal to resend a data packet upon detection of an error in the data packet previously received; and a reply controller for setting number of requests to be repetitively sent in accordance with the velocity information and, after the number of requests have been sent, sending command to change the designated data transfer rate to the mobile terminal.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates a velocity information table according to the second embodiment.

FIG. 7A illustrates an example of the format of a packet to be transmitted by using the CCH from a mobile terminal to a base station according to the second embodiment.

FIG. 7B illustrates an example of the packet to be transmitted by using the CCH from a mobile terminal to a base station according to the second embodiment.

FIG. 8 illustrates a transmit buffer according to the second embodiment.

FIG. 9A illustrates a number-of-requests management table according to the second embodiment.

FIG. 9B illustrates a number-of-requests management table after the change of maximum number of retransmission requests according to the second embodiment.

FIG. 14 illustrates an effect by a radio communication system according to the second embodiment.

FIG. 15 illustrates another effect by a radio communication system according to the second embodiment.

FIG. 17 is a flowchart illustrating a processing flow by a reply controller according to a third embodiment.

DESCRIPTION OF EMBODIMENTS

Hereinafter, the embodiments of the base station, radio communication system, and base-station control method disclosed according to the subject application will be described in detail with reference to drawings. The embodiments below however do not limit the present invention.

[Base Station According to First Embodiment]
[First Embodiment]

Figure 1:
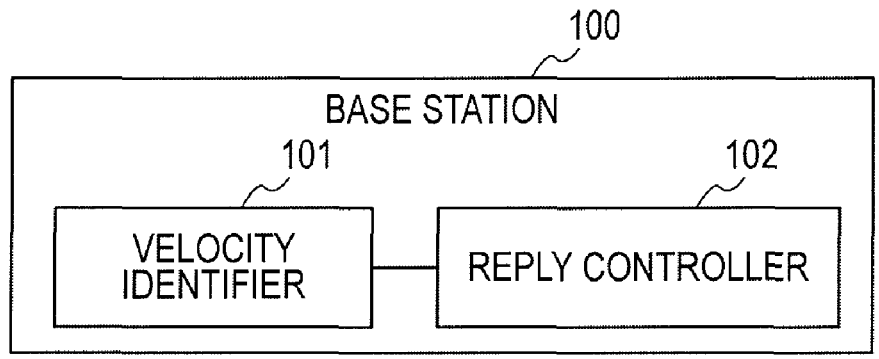
FIG. 1 is a block diagram illustrating an example of a base station according to a first embodiment.

With reference to FIG. 1, there will be described a configuration of a base station 100 according to a first embodiment of the present invention. FIG. 1 is a block diagram illustrating an example of a base station according to the first embodiment.

The base station 100 transmits and receives packets to and from a mobile terminal. The base station 100 includes, as illustrated in FIG. 1, a velocity identifier 101 and a reply controller 102. If receiving velocity information on the velocity of travel by the mobile terminal, the velocity identifier 101 determines whether the velocity of travel identified from the velocity information is higher than a predetermined velocity or not.

If the velocity identifier 101 determines the identified velocity of travel is higher than the predetermined velocity, the reply controller 102 changes a preset maximum number of retransmission requests (which will also be called number of requests) for retransmission processing on a packet to a lower number than the preset maximum number of retransmission requests.

[Processing by Base Station According to First Embodiment]

Figure 2:
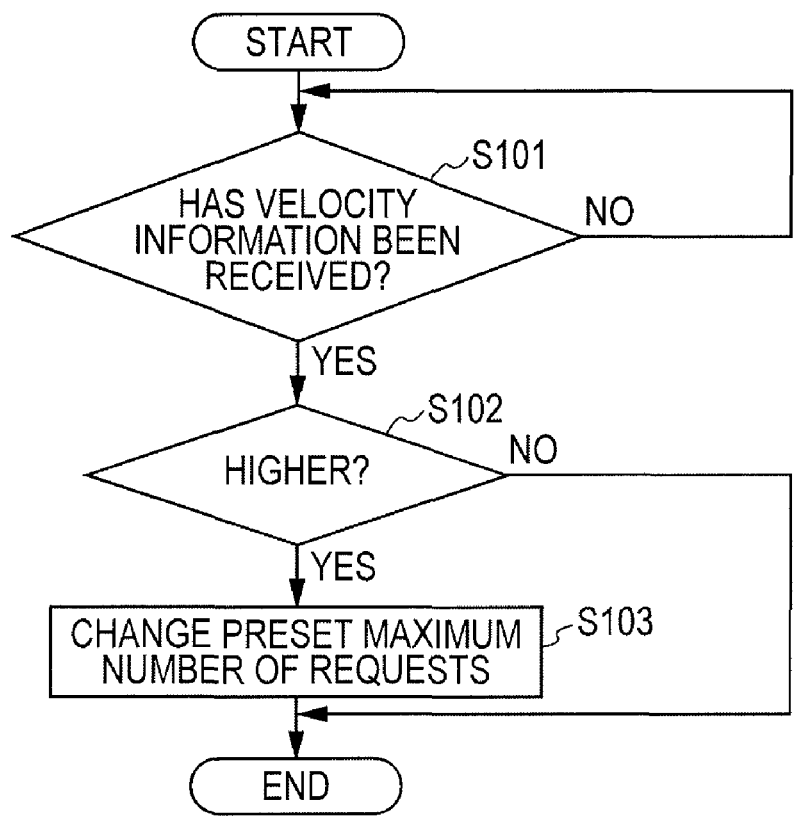
FIG. 2 is a flowchart illustrating an example of the processing flow by the base station according to the first embodiment.

Next, with reference to FIG. 2, there will be described an example of the processing flow by the base station 100 according to the first embodiment. FIG. 2 is a flowchart illustrating an example of the processing flow by the base station according to the first embodiment.

As illustrated in FIG. 2, in the base station 100, if receiving velocity information (Yes in operation S101), the velocity identifier 101 determines whether the velocity of travel identified from the velocity information is higher than a predetermined velocity or not (operation S102).

If so (Yes in operation S102), the reply controller 102 changes a preset maximum number of retransmission requests for retransmission processing on a packet to a lower number than the preset maximum number of retransmission requests (operation S103). On the other hand, if not (No in operation S102), the processing ends without changing the preset maximum number of retransmission requests.

[Effects by Base Station According to First Embodiment]

As described above, according to the first embodiment, if receiving velocity information, the base station 100 determines whether the velocity of travel identified from the velocity information is higher than a predetermined velocity or not. If so, the base station 100 changes a preset maximum number of retransmission requests for retransmission processing on a packet to a lower number than the preset maximum number of retransmission requests. As a result, ineffective repetition of retransmission processing may be avoided.

More specifically, while a mobile terminal is moving at a high velocity, the radio-wave propagation state may rapidly change. When the radio-wave propagation state is rapidly deteriorated, the resulting errors may not be fully corrected even with the repetition of retransmission processing. For example, this may correspond to the case where the packet received by a mobile terminal contains errors that are difficult to fully correct. In this case, the repetition of retransmission processing by the base station may not fully correct the errors, meaning that the retransmission processing is ineffective. According to the first embodiment, unlike the methods with a fixed maximum number of retransmission requests, the base station 100 reduces the maximum number of retransmission requests for retransmission processing while a mobile terminal is moving at a high velocity. Thus, the ineffective repetition of the retransmission processing may be avoided. In other words, according to the first embodiment, the retransmission processing is not repeated ineffectively.

[Second Embodiment]

Next, a radio communication system according to a second embodiment of the present invention will be described. A radio communication system according to the second embodiment includes a base station 200 and a mobile terminal 300. The base station 200 corresponds to the base station 100 according to the first embodiment. The points similar to the first embodiment will be described briefly.

In the radio communication system according to the second embodiment, the base station 200 and the mobile terminal 300 exchange packets. If the mobile terminal 300 unsuccessfully receives a packet, the base station 200 performs retransmission processing. If the velocity of travel by the mobile terminal 300 is higher than a predetermined velocity, the base station 200 changes a preset maximum number of retransmission requests for the retransmission processing to a lower number than the preset maximum number of retransmission requests, like the first embodiment.

First, the packet transmission and reception processing by the radio communication system according to the second embodiment will be briefly described. Then, the radio communication system according to the second embodiment will be described. After that, there will be described a detail processing flow by the radio communication system according to the second embodiment and effects by the second embodiment.

[Packet Transmission and Reception Processing by Radio Communication System According to Second Embodiment]

The processing by the radio communication system according to the second embodiment will be described briefly. A processing flow to be performed when the mobile terminal 300 receives a packet successfully according to the second embodiment and a processing flow to be performed when the mobile terminal 300 unsuccessfully receives a packet according to the second embodiment will be described sequentially.

The case where a packet is received successfully corresponds to a case where the packet received by the mobile terminal 300 does not contain errors or the case where the errors contained in the packet received by the mobile terminal 300 can be corrected by the mobile terminal 300. For example, a packet is given a redundancy bit for error correction. If the errors contained in the packet received by the mobile terminal 300 can be correctable by using the redundancy bit, this is the case where the packet is received successfully.

The case where a packet is received unsuccessfully corresponds to the case where the packet received by the mobile terminal 300 contains errors that are difficult to fully correct. For example, the case where the received packet contains errors that are difficult to fully correct even by using the redundancy bit may correspond thereto.

[Processing Flow in the Case Where Mobile Terminal Receives Packet Successfully According to Second Embodiment]

Figure 3:
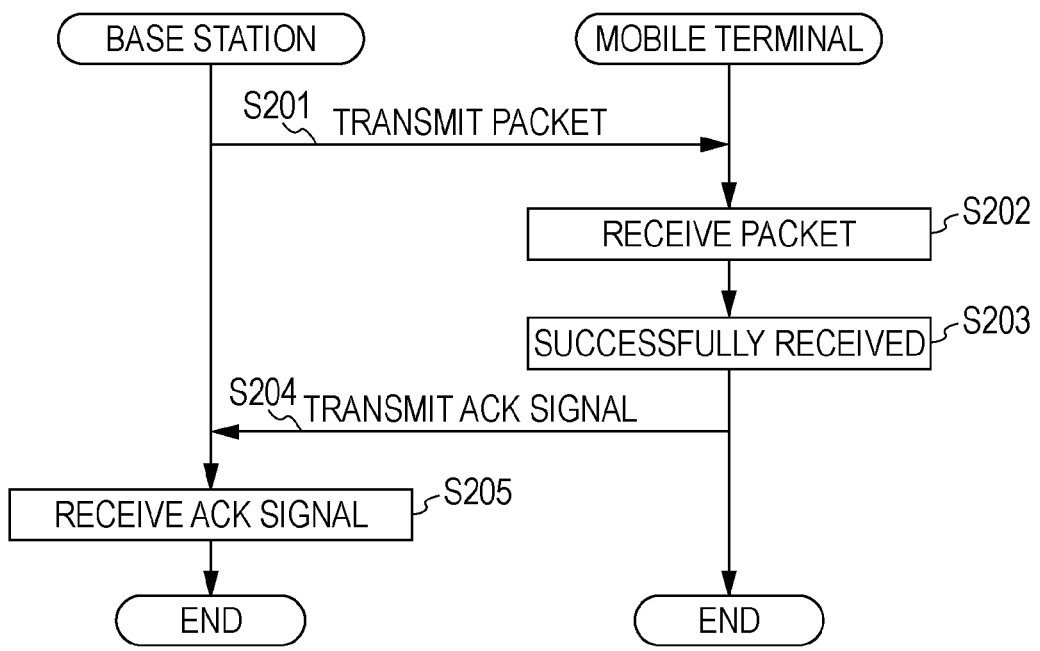
FIG. 3 is a sequence diagram illustrating a processing flow by a radio communication system in the case where a mobile terminal receives a packet successfully according to a second embodiment.

With reference to FIG. 3, there will be described the processing flow in the case where the mobile terminal 300 receives a packet successfully according to the second embodiment. More specifically, there will be described the processing flow in the case where the mobile terminal 300 receives a packet successfully, without the retransmission processing by the base station 200. FIG. 3 is a sequence diagram illustrating a processing flow in the case where a mobile terminal receives a packet successfully according to the second embodiment.

Referring to FIG. 3, in the radio communication system according to the second embodiment, the base station 200 transmits a packet to the mobile terminal 300 (operation S201). The mobile terminal 300 receives the packet (operation S202). If the mobile terminal 300 successfully receives the packet (operation S203), an ACK signal that is success information on the fact that the packet has been successfully received is transmitted to the base station 200 (operation S204).

If the base station 200 receives the ACK signal from the mobile terminal 300 (operation S205), the processing ends. After that, the base station 200 transmits the next packet to the mobile terminal 300.

[Processing Flow in the Case Where Mobile Terminal Receives Packet Unsuccessfully According to Second Embodiment]

Figure 4:
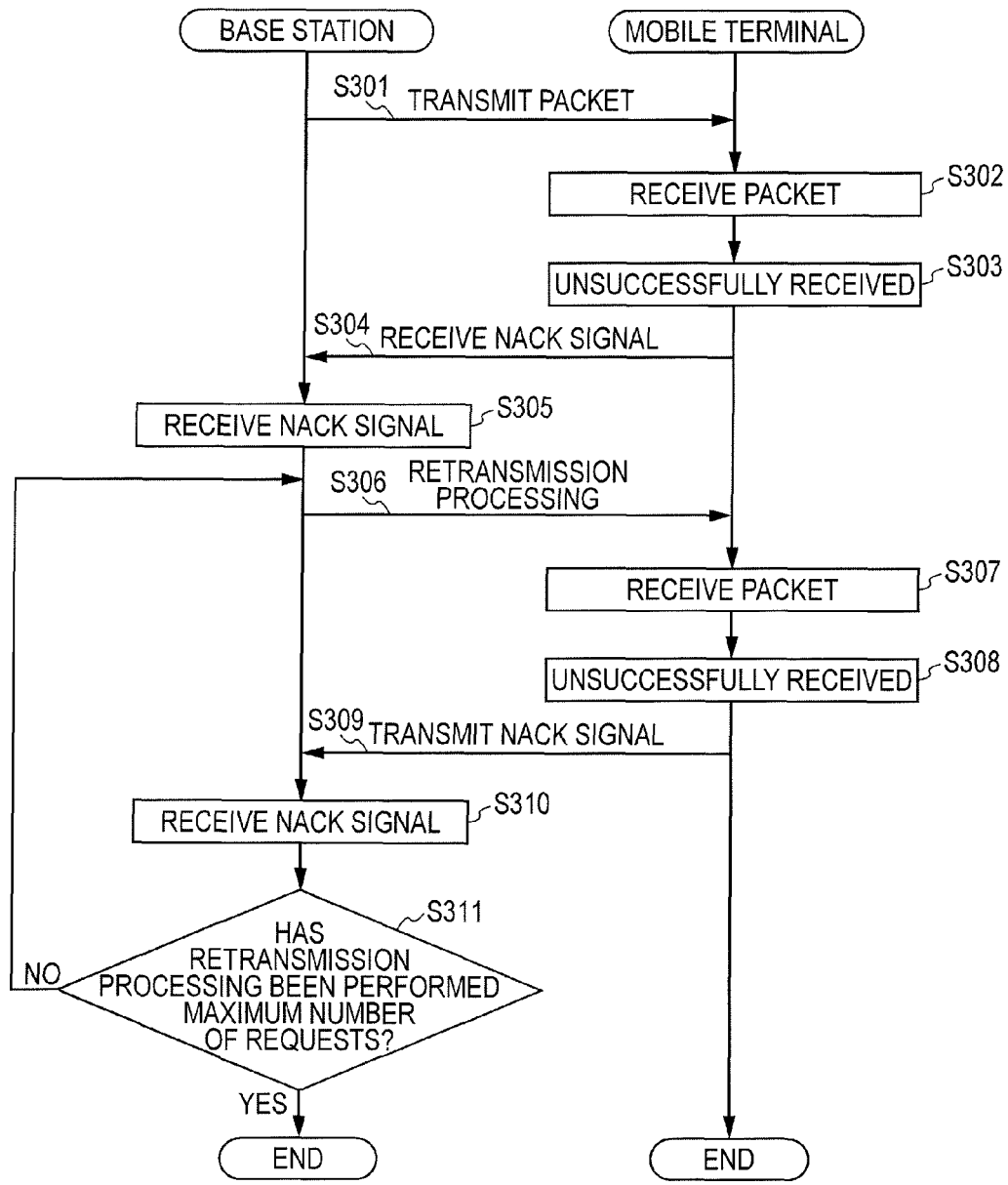
FIG. 4 is a sequence diagram illustrating a processing flow by the radio communication system in the case where the mobile terminal receives a packet unsuccessfully according to the second embodiment.

With reference to FIG. 4, there will be described the processing flow in the case where the mobile terminal 300 unsuccessfully receives a packet. More specifically, there will be described a processing flow in the case where the mobile terminal 300 receives a packet unsuccessfully even with the repetition of retransmission processing by the base station 200. FIG. 4 is a sequence diagram illustrating a processing flow in the case where the mobile terminal receives a packet unsuccessfully according to the second embodiment.

Referring to FIG. 4, in the radio communication system according to the second embodiment, the base station 200 transmits a packet to the mobile terminal 300 (operation S301). The mobile terminal 300 receives the packet (operation S302). If the mobile terminal 300 here receives the packet unsuccessfully (operation S303), a NACK signal that is failure information on the fact that the packet has been unsuccessfully received is transmitted to the base station 200 (operation S304).

If the base station 200 receives the NACK signal (operation S305), the base station 200 performs retransmission processing (operation S306). For example, the base station 200 may retransmit the packet or transmit a redundancy bit that has not been transmitted with puncturing.

Then, the mobile terminal 300 receives the packet or redundancy bit transmitted by the retransmission processing from the base station 200 (operation S307). If the mobile terminal 300 unsuccessfully receives the packet here (operation S308), the mobile terminal 300 transmits the NACK signal to the base station 200 (operation S309).

The case where a packet is received unsuccessfully in operation S308 may correspond to, for example, a case where errors contained in the packet are difficult to correct fully even by using the packet or redundancy bit transmitted by retransmission processing. For example, the case where the errors are difficult to correct fully though the mobile terminal 300 implementing HARQ attempts to correct the errors by synthesizing the held packet and the received packet or redundancy bit may correspond thereto.

If the base station 200 receives the failure information (operation S310) after the retransmission processing (operation S306 above) and if the retransmission processing has not been performed a predetermined maximum number of times (No in operation S311), the base station 200 repeats the retransmission processing (operation S306). On the other hand, if the base station 200 has performed the predetermined retransmission processing maximum number of times (Yes in operation S311), the base station 200 does not repeat the retransmission processing and restarts the transmission processing on the target packet of the retransmission processing from the beginning again.

There will be briefly described the case where the mobile terminal 300 receives a packet successfully by using the packet or redundancy bit transmitted by the retransmission processing in operation S308. In this case, the base station 200 receives the ACK signal from the mobile terminal 300 and ends the processing without repeating the retransmission processing.

The disclosed radio communication system may address the case where, while a mobile terminal is moving at a high velocity, the radio-wave propagation state easily changes, and the rapid deterioration of the radio-wave propagation state prevents the successful transmission of data even by the repetition of retransmission processing. More specifically, the disclosed radio communication system may address the case where, if the radio-wave propagation state is rapidly deteriorated while the mobile terminal 300 is moving at a high velocity, the mobile terminal 300 may not receive a packet successfully even with the repetition of the retransmission processing by the base station 200 in operation S306. In other words, if the base station 200 determines that the mobile terminal 300 is moving at a high velocity, the base station 200 reduces the preset maximum number of retransmission requests. As a result, the disclosed radio communication system can prevent the ineffective repetition of the retransmission processing in operation S306.

[Configuration of Radio Communication System According to Second Embodiment]

Figure 5:
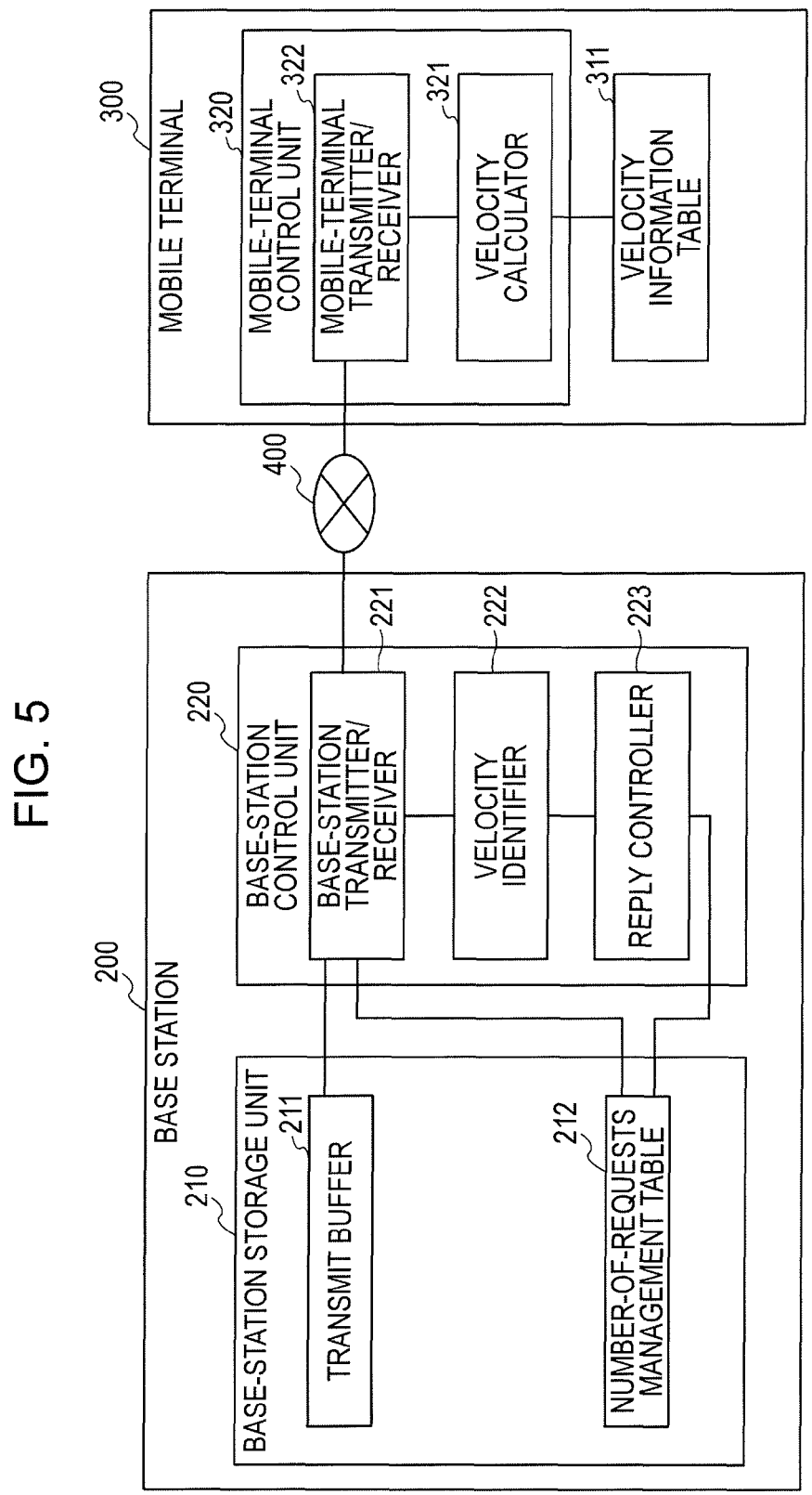
FIG. 5 is a block diagram illustrating an example of the radio communication system according to the second embodiment.

With reference to FIG. 5, there will be described an example of the radio communication system according to the second embodiment. FIG. 5 is a block diagram illustrating an example of the radio communication system according to the second embodiment.

The communication system includes a base station 200 and a mobile terminal 300 for sequentially sending a plurality of data packets at a designated data transfer rate and information of velocity of the mobile terminal 300 to the base station 200. The base station 200 includes a receiver 221 for receiving the data packet and the velocity information, a transmitter 221 for transmitting a request to the mobile terminal 300 to resend a data packet upon detection of an error in the data packet previously received, and a reply controller 223 for setting number of requests to be repetitively sent in accordance with the velocity information. After the number of requests have been sent, sending command to change the designated data transfer rate to the mobile terminal 300. The mobile terminal 300 will be described first, and the base station 200 will then be described.

[Mobile Terminal According to Second Embodiment]

The mobile terminal 300 is connected to the base station 200 over a radio communication network 400 and transmits and receives packets to and from the base station 200. The mobile terminal 300 may be a portable game machine, a personal digital assistant (PDA), a cellular phone, a personal handy phone system (PHS) or the like having a radio communication function. The mobile terminal 300 includes a velocity information table 311 and a mobile-terminal control unit 320 in the example illustrated in FIG. 5.

The velocity information table 311 is connected to a velocity calculator 321 within the mobile-terminal control unit 320 and stores the velocity information to be transmitted to the base station 200 in association with the velocity of travel by the mobile terminal 300, as illustrated in FIG. 6. FIG. 6 illustrates a velocity information table according to the second embodiment. In the example in FIG. 6, the velocity information table 311 stores the velocity information "00" in association with the velocity of travel "0 to 40 km/h" and velocity information "10" in association with the velocity of travel "140 km/h".

In the example illustrated in FIG. 6, 2-bit information is used. More specifically, information "00", "01" and "10" are used as velocity information, and the information "11" are reserved. The examples in FIG. 6 are given for illustration purpose only, and, for example, 1-bit velocity information may be used, and the datum "0" may be velocity information indicating the velocity is not higher, and the datum "1" may be velocity information indicating the velocity is higher. Alternatively, for example, "200 km/h or higher" or "300 km/h or higher" may be used instead of the illustrated "140 km/h".

The velocity information table 311 is used by the velocity calculator 321. The information stored in the velocity information table 311 is one prestored by a manager that manages the radio communication system.

The mobile-terminal control unit 320 is connected to the velocity information table 311 and is further connected to the base station 200 over the radio communication network 400. The mobile-terminal control unit 320 has an internal memory for storing programs defining calculation processing routines and performs various kinds of calculation processing. The mobile-terminal control unit 320 in the example illustrated in FIG. 5 has the velocity calculator 321 and a mobile-terminal transmitter/receiver 322.

The velocity calculator 321 is connected to the velocity information table 311 and mobile-terminal transmitter/receiver 322. The velocity calculator 321 calculates the velocity of travel by the mobile terminal 300. For example, the velocity calculator 321 may use a publicly known method to calculate the velocity of travel by the mobile terminal 300 and, for example, may use fading, a GPS signal or an accelerometer to calculate the velocity of travel.

For example, in the calculation of the velocity of travel by using fading, the velocity calculator 321 performs channel estimation for estimating the fading of receive data, defines the function resulting from the moving average in the time direction on the autocorrelation of the channel estimation value, compares between the value of the defined fading autocorrelation function that increases or decreases for each velocity of travel and a pre-acquired known value for the corresponding velocity of travel, and thus estimates the velocity of travel by the mobile terminal.

For example, in the calculation of the velocity of travel by using a GPS signal, the velocity calculator 321 acquires a GPS signal after every lapse of a predetermined time and identifies the amount of change in present position. The velocity calculator 321 then divides the amount of change in present position by the predetermined time for acquiring the GPS signal to calculate the velocity of travel.

After calculating the velocity of travel, the velocity calculator 321 refers to the velocity information table 311 and retrieves the velocity information corresponding to the calculated velocity of travel. For example, calculating the velocity of travel as "30 km/h", the velocity calculator 321 retrieves the velocity information "01". Calculating the velocity of travel as "150 km/h", the velocity calculator 321 retrieves the velocity information "10".

The velocity calculator 321 may transmit the retrieved velocity information such as the velocity information "10" to the mobile-terminal transmitter/receiver 322. Every time a packet is received or every lapse of a predetermined time, the velocity calculator 321 calculates the velocity of travel and retrieves the velocity information. Every time the velocity information is retrieved, the velocity calculator 321 transmits the velocity information to the mobile-terminal transmitter/receiver 322. The velocity information acquired by the velocity calculator 321 is transmitted by the mobile-terminal transmitter/receiver 322 to the base station 200.

The mobile-terminal transmitter/receiver 322 is connected to the velocity calculator 321 and is connected to the base station 200 over the radio communication network 400.

The mobile-terminal transmitter/receiver 322 transmits and receives packets to and from the base station 200. More specifically, if the mobile-terminal transmitter/receiver 322 receives a packet from the base station 200, the mobile-terminal transmitter/receiver 322 determines whether the packet has been successfully received or not. Then, the mobile-terminal transmitter/receiver 322 transmits the determination result to the base station 200. For example, if so, the mobile-terminal transmitter/receiver 322 transmits the ACK signal. If not, the mobile-terminal transmitter/receiver 322 transmits the NACK signal. For example, the mobile-terminal transmitter/receiver 322 uses a control channel (CCH) to transmit the determination result. The CCH is a channel to be used for transmission and reception of a control signal for the base station 200 or mobile terminal 300.

The mobile-terminal transmitter/receiver 322 receives the velocity information from the velocity calculator 321 and transmits the received velocity information to the base station 200. More specifically, the latest velocity information of the velocity information received from the velocity calculator 321 is transmitted to the base station 200. For example, every time the mobile-terminal transmitter/receiver 322 receives a packet and transmits the determination result, the mobile-terminal transmitter/receiver 322 transmits the velocity information.

For example, in the example illustrated in FIG. 7A, the mobile-terminal transmitter/receiver 322 transmits the determination result indicating whether the corresponding packet has been received successfully or not along with the velocity information to the base station 200. FIG. 7A illustrates an example of the format of a packet to be transmitted by using the CCH from a mobile terminal to a base station according to the second embodiment.

In the example illustrated in FIG. 7A, the mobile-terminal transmitter/receiver 322 transmits a packet containing information "ACK/NACK", "channel quality indicator (CQI)", "process number", "decoding parameter", "velocity information" and "others" by using the CCH.

In the example illustrated in FIG. 7A, the information "ACK/NACK" indicates whether the packet has been received successfully or not, and for example, stores the ACK signal or NACK signal. The information "CQI" indicates the radio-wave propagation state of the mobile terminal 300. For example, the base station 200 may transmit a pilot signal, and the mobile station 300 may receive the pilot signal and measures the received SIR of the pilot signal. In this case, the mobile station 300 quantizes the measured received SIR to 32 values and transmits the quantized values to the base station 200. The information "decoding parameter" defines a plurality of modulation and coding scheme sets (MCS sets) (each of which may be a combination of a modulation scheme and a channel coding scheme) and is used for changing the MCS set in accordance with the reception state by the mobile station 300 in communication. More specifically, when the reception state of the mobile station 300 is bad, a lower encoding rate and/or a lower modulation level may be used. Thus, in accordance with the reception state, high levels of the reception quality can be secured. The information "others" includes a redundancy version (RV) parameter, a transport channel identity, a transport block set size and so on.

In the example illustrated in FIG. 7B, the mobile-terminal transmitter/receiver 322 transmits a packet containing the "NACK" of the information ACK/NACK, the CQI "30" indicating the highest reception state, the process number "#2", the decoding parameter "modulation and coding parameter (MCS set) in the uplink direction", the velocity information "10" and the "transport block set size and RV parameter" as the information "others". FIG. 7B illustrates an example of the packet to be transmitted by using the CCH from a mobile terminal to a base station according to the second embodiment.

[Configuration of Base Station According to Second Embodiment]

As illustrated in FIG. 5, the base station 200 is connected to the mobile terminal 300 over the radio communication network 400 and transmits and receives packets to and from the mobile terminal 300. The base station 200 in the example illustrated in FIG. 5 includes a base-station storage unit 210 and a base-station control unit 220.

The base-station storage unit 210 is connected to the base-station control unit 220 and stores data to be used for transmission control processing by the base-station control unit 220. The base-station storage unit 210 in the example illustrated in FIG. 5 includes a transmit buffer 211 and a number-of-requests management table 212.

The transmit buffer 211 is connected to a base-station transmitter/receiver 221 within the base-station control unit 220 and, as illustrated in FIG. 8, stores a packet to be transmitted from the base station 200 to the mobile terminal 300. FIG. 8 illustrates a transmit buffer according to the second embodiment.

In the example illustrated in FIG. 8, the transmit buffer 211 stores data in storage areas "#1" to "#6". The packets in the transmit buffer 211 are sequentially read and transmitted by the base-station transmitter/receiver 221, which will be described later, to the mobile terminal 300. In the example illustrated in FIG. 8, the packets stored in the transmit buffer 211 are read and transmitted in order from "#1" to "#6" by the base-station transmitter/receiver 221.

The transmit buffer 211 stores the packets transmitted by the base station 200. The packets stored in the transmit buffer 211 are discarded by the base-station transmitter/receiver 221, and a new packet is stored by the base station 200, as will be described later.

The number-of-requests management table 212 is connected to the base-station transmitter/receiver 221 and a reply controller 223 within the base-station control unit 220 and stores the number of requests of the retransmission processing performed for each packet transmitted from the base station 200 to the mobile terminal 300. The number-of-requests management table 212 further stores a preset maximum number of retransmission requests of retransmission processing to be performed on a packet.

For example, as illustrated in FIG. 9A, the number-of-requests management table 212 stores the "number of retransmission requests" for each "process number" identifying a packet stored in the transmit buffer 211 and further stores the "maximum number of retransmission requests". FIG. 9A illustrates a number-of-requests management table according to the second embodiment. In the example illustrated in FIG. 9A, the number-of-requests management table 212 stores the number of performed retransmission requests "0" in association with the process number "#1" and stores the number of performed retransmission requests "4" in association with the process number "#2". The number-of-requests management table 212 further stores the maximum number of retransmission requests "4". The process numbers "#1" to "#6" correspond to the packets in the storage areas "#1" to "#6", respectively, in the transmit buffer 211.

In other words, in the example illustrated in FIG. 9A, the number-of-requests management table 212 stores the fact that no retransmission processing has been performed on the packet in the storage area "#1" in the transmit buffer 211 but "4" retransmission requests have been performed on the packet in the storage area "#2" in the transmit buffer 211. The number-of-requests management table 212 further stores the fact that the maximum number of retransmission requests of "4" means that up to four retransmission requests are to be performed on one same packet.

The number-of-requests management table 212 updates the number of performed retransmission requests every time the base-station transmitter/receiver 221 performs a retransmission request. The number-of-requests management table 212 initially has a preset maximum number of retransmission requests. In the example illustrated in FIG. 9A, the number "4" is preset. On the number-of-requests management table 212, the reply controller 223 changes the preset maximum number of retransmission requests to a lower number than the preset maximum number of retransmission requests, as will be described later. In the example illustrated in FIG. 9B, the number "4" is changed to the number "2". FIG. 9B illustrates a number-of-requests management table after the change of maximum number of retransmission requests according to the second embodiment.

The communication system includes plurality of mobile terminals such as the mobile terminal 300. After the reply controller 223 has changed the number of requests, the reply controller 223 applies the changed number of requests to all the mobile terminals.

The base station 200 applies one same preset maximum number of retransmission requests to different mobile terminals 300. If the reply controller 223 changes the preset maximum number of retransmission requests to a lower number, the base station 200 applies the changed maximum number of retransmission requests to different mobile terminals 300, as will be described later.

The number of performed retransmission requests and maximum number of retransmission requests stored in the number-of-requests management table 212 are to be used by the base-station transmitter/receiver 221. The maximum number of retransmission requests stored in the number-of-requests management table 212 is changed by the reply controller 223.

The base-station control unit 220 is connected to the base-station storage unit 210 and is further connected to the mobile terminal 300 over the radio communication network 400. In the example illustrated in FIG. 5, the base-station control unit 220 includes the base-station transmitter/receiver 221, a velocity identifier 222, and the reply controller 223.

The base-station transmitter/receiver 221 is connected to the transmit buffer 211, the number-of-requests management table 212, and the velocity identifier 222 and is further connected to the mobile terminal 300 over the radio communication network 400. An example of the detail processing flow by the base-station transmitter/receiver 221 will be described later.

The base-station transmitter/receiver 221 sequentially reads and transmits packets stored in the transmit buffer 211 to the mobile terminal 300. More specifically, if the base-station transmitter/receiver 221 receives the ACK signal from the mobile terminal 300 after transmitting a packet, the base-station transmitter/receiver 221 discards the transmitted packet from the transmit buffer 211 and sets the "number of retransmission requests" in the number-of-requests management table 212 to "0". Then, the base-station transmitter/receiver 221 reads the next packet from the transmit buffer 211 and transmits the read next packet.

Figure 10:
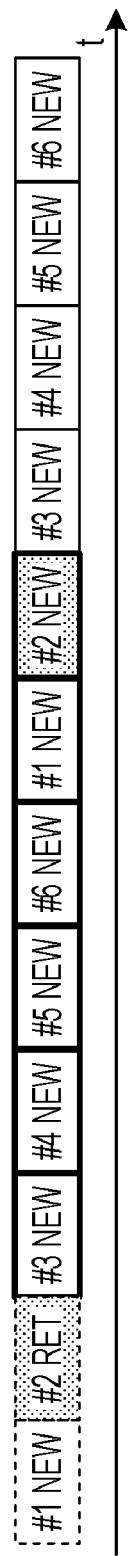
FIG. 10 illustrates a base-station transmitter/receiver according to the second embodiment.

For example, as illustrated in FIG. 10, the base-station transmitter/receiver 221 sequentially transmits from the packet in the storage area "#1" to the packet in the storage area "#6" in the transmit buffer 211. FIG. 10 illustrates a base-station transmitter/receiver according to the second embodiment. The base-station transmitter/receiver 221 after transmitting the packet in the storage area "#6" reads and transmits the packet in the storage area "#1" and then repeats the transmission processing in the same manner. FIG. 10 illustrates the example in which the packet in the storage area "#2 RET" is deleted, and the packet in the storage area "#2NEW" to be newly transmitted is stored. Thus, the base-station transmitter/receiver 221 next transmits the packet in the storage area "#3". The term "RET" in FIG. 10 refers to a packet in retransmission processing, and the term "NEW" refers to a packet to be newly transmitted.

If the base-station transmitter/receiver 221 after transmitting a packet receives the NACK signal from the mobile terminal 300, the base-station transmitter/receiver 221 performs the retransmission processing.

Now, with reference to FIG. 7B, there will be described an example in which the base-station transmitter/receiver 221 uses a CCH to receive the "NACK" of the information ACK/NACK and the packet containing the process number "#2" from the mobile terminal 300. The base-station transmitter/receiver 221 counts up the "number of retransmission requests" in the number-of-requests management table 212. For example, the base-station transmitter/receiver 221 may count up one count for the number of performed retransmission requests corresponding to the process number "#2" and changes the number of performed retransmission requests "0" to "1".

The base-station transmitter/receiver 221 further determines whether the number of performed retransmission requests is higher than the preset maximum number of retransmission requests or not. If no, the base-station transmitter/receiver 221 performs the retransmission processing. For example, if the preset maximum number of retransmission requests is "4" and if the number of performed retransmission requests corresponding to the process number "#2" is "4" or below, the base-station transmitter/receiver 221 performs the retransmission processing. The retransmission processing by the base-station transmitter/receiver 221 may include, for example, retransmitting the corresponding packet or transmitting a redundancy bit which has not been transmitted with puncturing.

The base-station transmitter/receiver 221 determines whether the number of performed retransmission requests is higher than the maximum number of retransmission requests or not. If so, the base-station transmitter/receiver 221 does not perform the retransmission processing but restarts transmitting the target packet of the retransmission processing from the beginning. For example, if the number of performed retransmission requests corresponding to the process number "#2" is "5", the base-station transmitter/receiver 221 does not perform the retransmission processing but discards the target packet of the retransmission processing from the transmit buffer 211 and sets the number of performed retransmission requests corresponding to the process number "#2" from "5" to "0". In other words, the reply controller 223 clears the number of performed retransmission requests in the transmit buffer 211 and the number-of-requests management table 212. After that, the base station 200 stores the packet to the transmit buffer 211 again and restarts the transmission processing on the packet from the beginning. In other words, the base-station transmitter/receiver 221 does not repeat the retransmission processing beyond the maximum number of retransmission requests but restarts the transmission processing on the target packet of the retransmission processing from the beginning.

If the base-station transmitter/receiver 221 after performing the retransmission processing receives the ACK signal from the mobile terminal 300, the base-station transmitter/receiver 221 reads the next packet from the transmit buffer 211 and transmits the read next packet, as described above.

In order to transmit a packet, the base-station transmitter/receiver 221 determines the transmission condition according to the latest "CQI". More specifically, the base-station transmitter/receiver 221 receives the "CQI" from the mobile terminal 300 via a CCH and uses the latest "CQI" within the received "CQI" to determine the transmission condition. The transmission condition may correspond to, for example, a transmission power or an encoding ratio. The base-station transmitter/receiver 221 may use the determined transmission power or encoding ratio to transmit a packet.

The base-station transmitter/receiver 221 uses the transmission condition for the first transmission to perform the retransmission processing. For example, the base-station transmitter/receiver 221 may use the same transmission power as that for the first transmission to perform the retransmission processing.

If the base-station transmitter/receiver 221 receives from the mobile terminal 300 the velocity information on the velocity of travel by the mobile terminal 300, the base-station transmitter/receiver 221 transmits the received velocity information to the velocity identifier 222. For example, in the example illustrated in FIG. 7B, the base-station transmitter/receiver 221 may receive a packet from the mobile terminal 300 via the CCH and transmits the velocity information "10" contained in the received packet to the velocity identifier 222.

The velocity identifier 222 is connected to the base-station transmitter/receiver 221 and the reply controller 223. If receiving from the base-station transmitter/receiver 221 the velocity information on the velocity of travel by the mobile terminal 300, the velocity identifier 222 determines whether the velocity of travel identified from the velocity information is higher than a predetermined velocity or not.

For example, referring to FIG. 6, if the velocity identifier 222 receives velocity information "00" or "01", that is, if the velocity of travel by the mobile terminal 300 is low or medium, the velocity identifier 222 determines that the velocity is not higher than the predetermined velocity. On the other hand, the velocity identifier 222 receives velocity information "10", that is, if the velocity of travel by the mobile terminal 300 is high, the velocity identifier 222 determines the velocity is higher than the predetermined velocity.

If the velocity identifier 222 determines that the velocity of travel is higher than the predetermined velocity, the velocity identifier 222 notifies the fact that the velocity of travel is high to the reply controller 223.

The reply controller 223 is connected to the velocity identifier 222 and number-of-requests management table 212. If the reply controller 223 receive the notification of high velocity from the velocity identifier 222, that is, if the velocity identifier 222 determines that the velocity of travel is higher than the predetermined velocity, the reply controller 223 changes the preset maximum number of retransmission requests on a packet to a lower number than the preset maximum number of retransmission requests. For example, in the examples illustrated in FIGS. 9A and 9B, the reply controller 223 changes the preset maximum number of retransmission requests from "4" to "2".

When a predetermined period of time has passed after the change of the maximum number of retransmission request, the reply controller 223 returns the changed maximum number of retransmission requests to the preset maximum number of retransmission requests. For example, the predetermined period of time may be "30 msec". In this case, after a lapse of "30 msec" after the reply controller 223 changes the maximum number of retransmission requests from "4" to "2", the changed maximum number of retransmission requests is returned from "2" to "4". For example, every time the base station 200 receives a packet, the reply controller 223 may determine whether the predetermined period of time has passed after the preset maximum number of retransmission requests is changed to a lower number. The detail processing flow of the processing for returning the changed maximum number of retransmission requests by the reply controller 223 will be described later.

The predetermined period of time to be used by the reply controller 223 may be slightly longer than the time for the mobile terminal 300 moving at a high velocity to leave the sector of one base station 200, for example. Thus, when a packet is transmitted from the base station 200 to the mobile terminal 300 moving at a high velocity within the sector of the base station 200, the preset maximum number of retransmission requests is reduced. When the mobile terminal 300 moving at a high velocity leaves the sector of the base station 200, the changed maximum number of retransmission requests is returned to the preset one.

[Processing by Mobile Terminal According to Second Embodiment]

Figure 11:
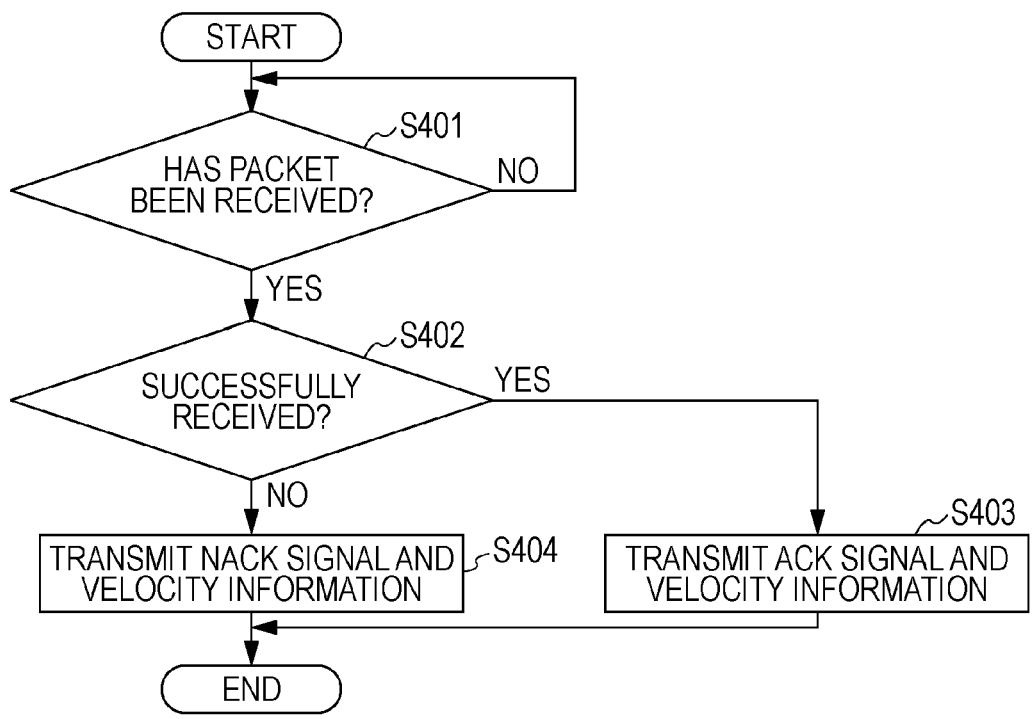
FIG. 11 is a flowchart illustrating a processing flow by a mobile terminal according to the second embodiment.

Next, with reference to FIG. 11, a processing flow by the mobile terminal 300 according to the second embodiment will be described. FIG. 11 is a flowchart illustrating a processing flow by a mobile terminal according to the second embodiment. In the processing flow in FIG. 11, the mobile terminal 300 transmits both of the determination result on whether a target packet has been received successfully or not and the velocity information. Every time the mobile terminal 300 receives a packet, the following processing is to be performed.

As illustrated in FIG. 11, if the mobile terminal 300 according to the second embodiment receives a packet from the base station 200 (Yes in operation S401), the mobile-terminal transmitter/receiver 322 determines whether the packet has been received successfully or not (operation S402). The mobile-terminal transmitter/receiver 322 may determine so (Yes in operation S402) if the received packet does not contain errors, for example. In that case, the mobile-terminal transmitter/receiver 322 transmits the ACK signal and the velocity information (operation S403). For example, the mobile-terminal transmitter/receiver 322 transmits a packet containing "ACK" of the information ACK/NACK and the velocity information "10" via a CCH to the base station 200.

On the other hand, the mobile-terminal transmitter/receiver 322 may determine that the packet has not been received successfully (No in operation S402) if the received packet contains errors that are difficult to correct fully, for example. In that case, the mobile-terminal transmitter/receiver 322 transmits the NACK signal and the velocity information (operation S404). For example, the mobile-terminal transmitter/receiver 322 transmits a packet containing "NACK" of the information ACK/NACK and the velocity information "10" via a CCH to the base station 200.

[Processing by Base-Station Transmitter/Receiver According to Second Embodiment]

Figure 12:
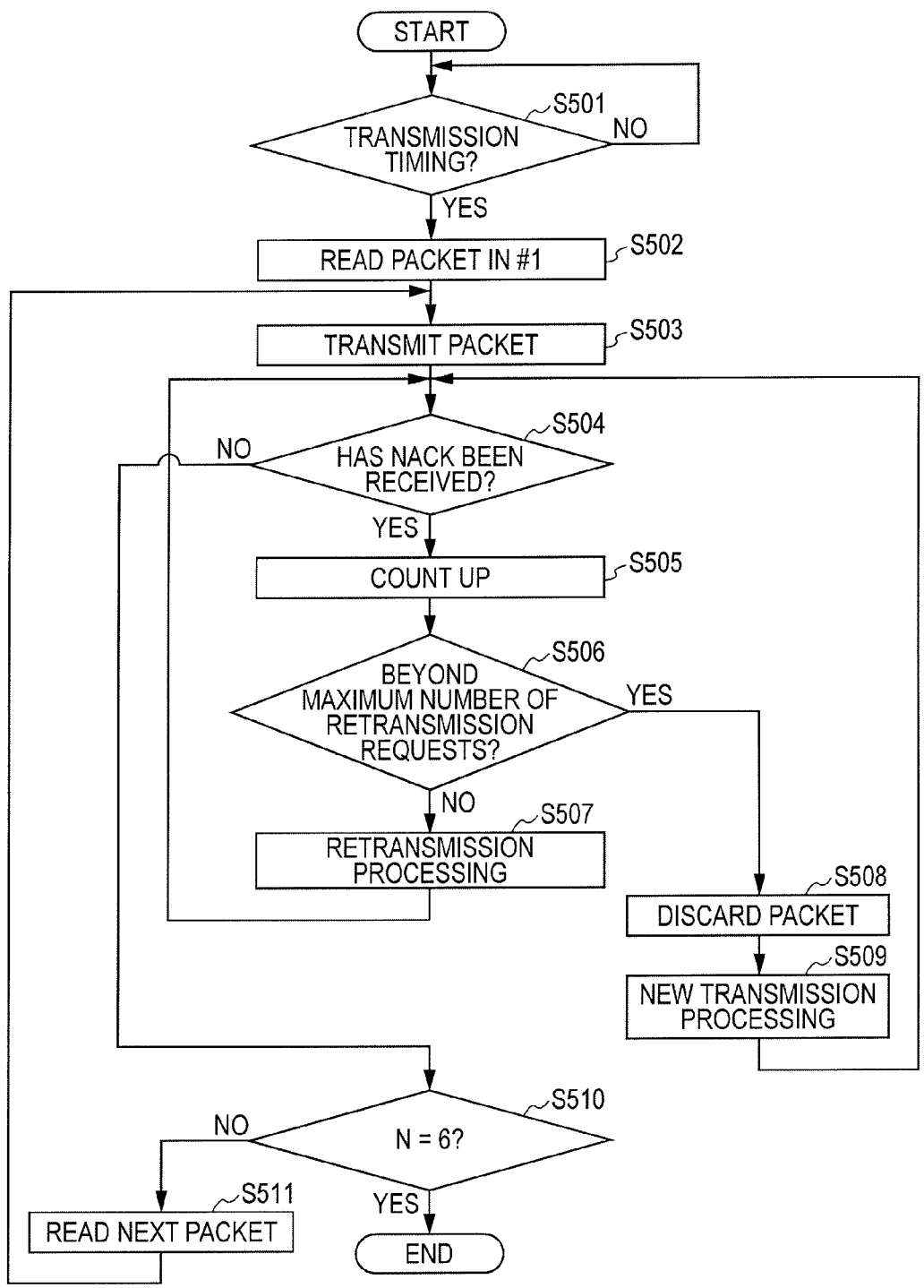
FIG. 12 is a flowchart illustrating a processing flow by a base-station transmitter/receiver according to the second embodiment.

Next, with reference to FIG. 12, a processing flow by the base-station transmitter/receiver 221 according to the second embodiment will be described. FIG. 12 is a flowchart illustrating a processing flow by a base-station transmitter/receiver according to the second embodiment. Hereinafter, there will be described a case where the base-station transmitter/receiver 221 sequentially transmits packets in the storage areas "#1" to "#6".

As illustrated in FIG. 12, in the base station 200 according to the second embodiment in transmission timing (Yes in operation S501), the base-station transmitter/receiver 221 reads the packet in the storage area "#1" from the transmit buffer 211 (operation S502). Then, the base-station transmitter/receiver 221 transmits the read packet to the mobile terminal 300 (operation S503).

After that, the base-station transmitter/receiver 221 determines whether the NACK signal that is failure information indicating the packet has not been received successfully is received or not (operation S504). If so (Yes in operation S504), the base-station transmitter/receiver 221 counts up the number of performed retransmission requests stored in the number-of-requests management table 212 (operation S505). For example, the base-station transmitter/receiver 221 counts up the number of performed retransmission requests corresponding to the packet in the storage area "#1" by "1". For example, the base-station transmitter/receiver 221 may count up the number of performed retransmission requests from "0" to "1".

The base-station transmitter/receiver 221 then determines whether the count is higher than the preset maximum number of retransmission requests or not (operation S506). If not (No in operation S506) and if, for example, the preset maximum number of retransmission requests is "4" and the number of performed retransmission requests is "3", the base-station transmitter/receiver 221 performs the retransmission processing (operation S507). Then, the base-station transmitter/ receiver 221 returns the processing to operation S504 and determines whether the NACK signal has been received or not.

On the other hand, if the base-station transmitter/receiver 221 determines that the count is higher than the preset maximum number of retransmission requests (Yes in operation S506), the base-station transmitter/receiver 221 discards the target packet of the retransmission processing from the transmit buffer 211 (operation S508) and starts new transmission processing on the packet (operation S509). In other words, the base-station transmitter/receiver 221 does not repeat the retransmission processing but discards the packet once and restarts transmitting the packet from the beginning.

There will be described the case where, in operation S504, the base-station transmitter/receiver 221 determines that the NACK signal has not been received (No in operation S504), that is, the ACK signal has been received. The base-station transmitter/receiver 221 determines whether the packets up to the packet in the storage area "#6" have been transmitted or not (operation S510). If so (Yes in operation S510), the base-station transmitter/receiver 221 ends the processing. If not (No in operation S510) on the other hand, the base-station transmitter/receiver 221 reads the next packet from the transmit buffer 211 (operation S511) and transmits the packet (operation S503). Until the determination that the packets up to the packet in the storage area "#6" have been transmitted, the processing is repeated.

[Processing for Returning Maximum Number of Retransmission Requests by Reply Controller]

Figure 13:
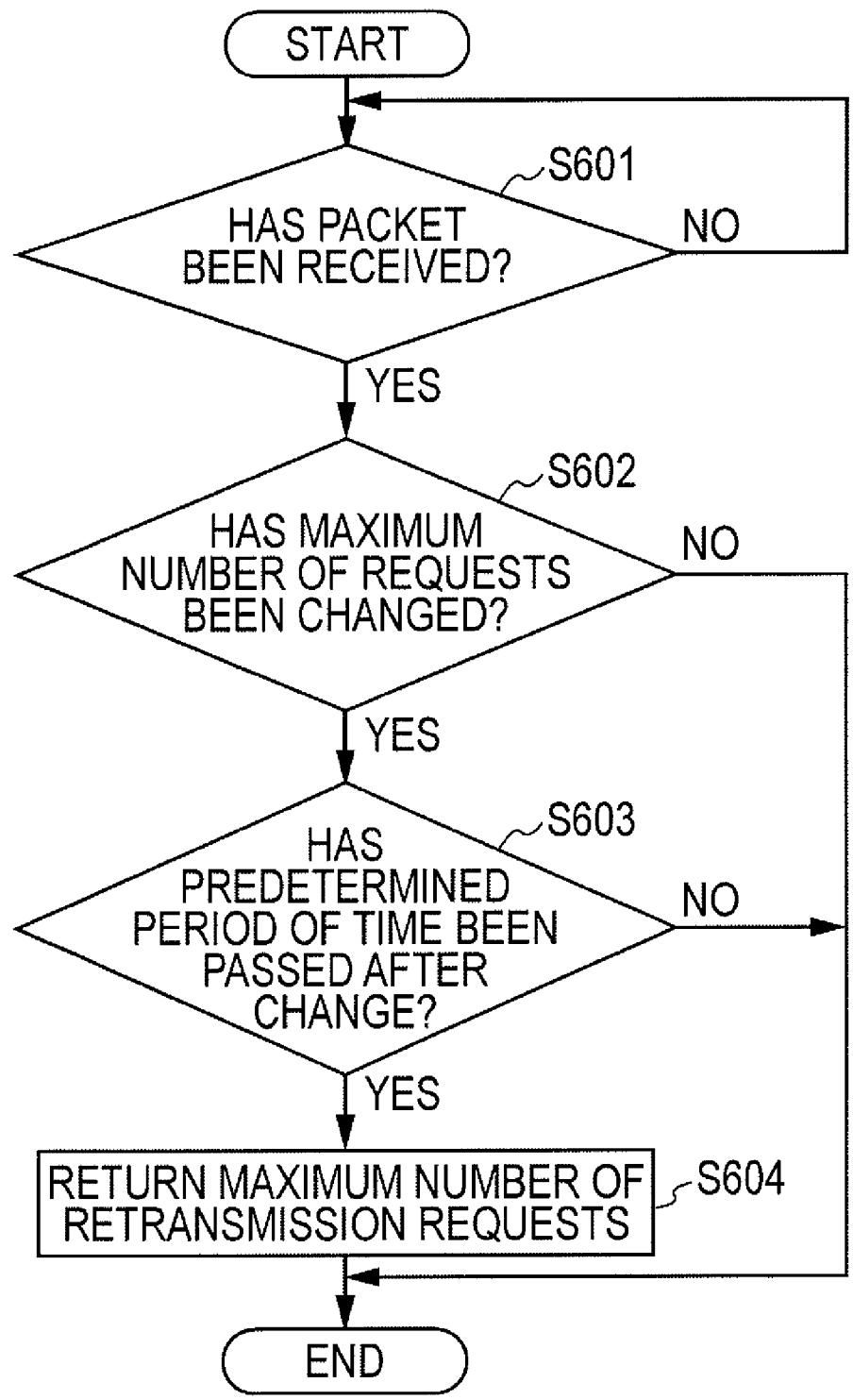
FIG. 13 is a flowchart illustrating a processing flow for returning the changed maximum number of retransmission requests by a reply controller according to the second embodiment.

Next, with reference to FIG. 13, there will be described a processing flow for returning the changed maximum number of retransmission requests by the reply controller 223 according to the second embodiment. FIG. 13 is a flowchart illustrating a processing flow for returning the changed maximum number of retransmission requests by a reply controller according to the second embodiment. After the number of requests has been sent, the reply controller 223 changes the number of requests in accordance with the velocity information.

As illustrated in FIG. 13, if the reply controller 223 according to the second embodiment receives a packet (Yes in operation S601), the reply controller 223 determines whether the maximum number of retransmission requests has been changed or not (operation S602), that is, whether the maximum number of retransmission requests has been changed to a lower number or not. If not (No in operation S602), that is, the maximum number of retransmission requests is the preset maximum number of retransmission requests, the reply controller 223 ends the processing without performing any operations.

If so on the other hand (Yes in operation S602), that is, if the maximum number of retransmission requests is a lower number than the preset maximum number of retransmission requests, the reply controller 223 determines whether a predetermined period of time has passed after the change or not (operation S603). For example, a timer may be started from the change of the maximum number of retransmission requests from "4" to "2" to measure the elapsed time, and the reply controller 223 may determine whether the elapsed time is longer than the predetermined period of time or not.

If the reply controller 223 determines that the predetermined period of time has passed (Yes in operation S603), the reply controller 223 returns the changed maximum number of retransmission requests to the preset maximum number of retransmission requests (operation S604) from "2" to "4", for example. If not (No in operation S603) on the other hand, the reply controller 223 ends the processing without performing any operations.

Having described with reference to FIG. 13 the example in which the determination is performed every time a packet is received, the present invention is not limited thereto. For example, independently of the time when a packet is received, the determination may be performed every lapse of a predetermined period of time.

[Effects of Second Embodiment]

According to the second embodiment, if receiving the velocity information on a mobile terminal, the base station 200 determines whether the velocity of travel identified from the velocity information is higher than a predetermined velocity or not. If so, the base station 200 changes the preset maximum number of retransmission requests to a lower number of requests. This can prevent the ineffective repetition of retransmission processing.

Figure 16:
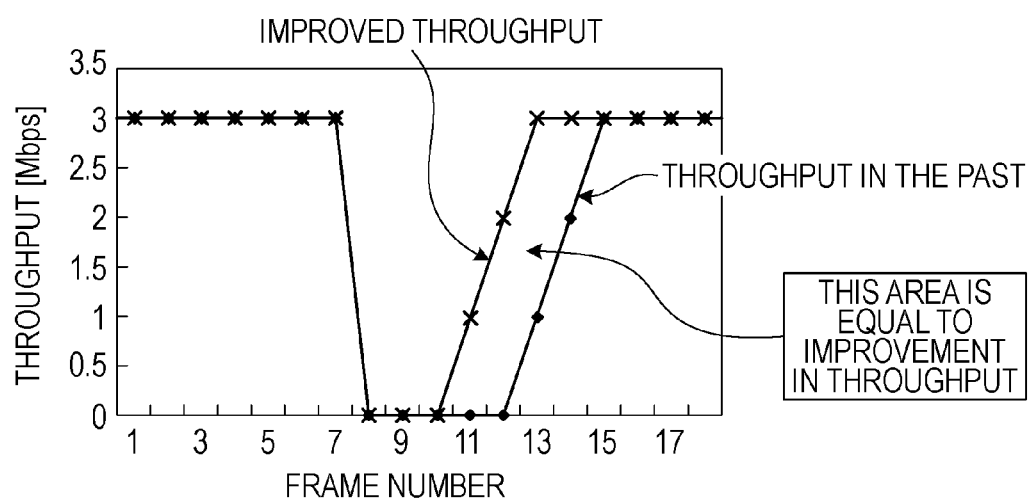
FIG. 16 illustrates another effect by a radio communication system according to the second embodiment.

With reference to FIGS. 14 to 16, effects by a radio communication system according to the second embodiment will be described. FIGS. 14 to 16 illustrate effects by a radio communication system according to the second embodiment. There will be described an example where the mobile terminal 300 is moving at a high velocity and errors contained in a packet requested to transmit to the mobile terminal 300 are difficult to fully correct even by the repetition of the retransmission processing. In the example, the preset maximum number of retransmission requests is "4". The base station 200 transmits a packet in the storage area "#2" with a frame number "8" but receives the NACK signal. The frame numbers in FIGS. 14 to 16 are information indicating the sequence numbers of the transmitted packets.

As illustrated in FIG. 14, when the maximum number of retransmission requests is typically fixed, the base station 200 repeats the retransmission processing the maximum number of retransmission requests "4", as indicated at the frame numbers "9" to "12". After that, the base station 200 starts transmitting the packet from the beginning, as indicated at the frame number "13".

During the retransmission processing, the throughput drops. The throughputs in the example in FIGS. 14 and 16 are "0". The throughput is improved when the mobile terminal 300 successfully receives a packet as a result of four retransmission requests and restart of the transmission processing on the packet by the base station. FIGS. 14 and 16 illustrate the improved throughput at the frame number "13".

On the other hand, as illustrated in FIG. 15, while the mobile terminal 300 is moving at a high velocity, the base station 200 according to the second embodiment reduces the preset maximum number of retransmission requests. Thus, as indicated at the frame numbers "9" and "10", the base station 200 according to the second embodiment repeats the retransmission processing the reduced number of requests that is lower than the preset maximum number of retransmission requests. In the example illustrated in FIG. 15, the base station 200 repeats the retransmission processing "2" times. After that, the base station 200 restarts transmitting the packet from the beginning, as indicated at the frame number "11".

After repeating the retransmission processing "2" times, the base station 200 restarts transmitting the packet from the beginning. If the mobile terminal 300 successfully receives the packet restarted to transmit from the beginning by the base station 200, the throughput improves. The throughput improves at the frame number "11" as illustrated in FIGS. 15 and 16. In other words, the reduction of the maximum number of retransmission requests by the base station 200 while the mobile terminal 300 is moving at a high velocity can reduce the period with a lower throughput due to the retransmission processing. Furthermore, the throughput can be recovered earlier than methods in the past.

According to the second embodiment, the base station 200 applies one same maximum number of retransmission requests to different mobile terminals. When the reply controller 223 changes the preset maximum number of retransmission requests to a lower number, the base station 200 applies the changed maximum number of retransmission requests to different mobile terminals. Thus, the base station 200 can change and apply the maximum number of retransmission requests to different mobile terminals without individually identifying them. As a result, the speed can be increased for the processing of changing and applying the maximum number of retransmission requests.

According to the second embodiment, after a lapse of a predetermined period of time from the change of the maximum number of retransmission requests to a lower number, the reply controller 223 returns the changed maximum number of retransmission requests to the preset maximum number of retransmission requests. Thus, when the mobile terminal 300 moving at a high velocity leaves the sector of the base station 200, the automatic return can be implemented to the preset maximum number of retransmission requests. As a result, the maximum number of retransmission requests can be kept properly.

[Third Embodiment]

Having described the embodiments of the present invention up to this point, the present invention may be implemented by other embodiments excluding the aforementioned embodiments. Other embodiments will be described below.

For example, according to the second embodiment, the base station 200 sequentially transmits the packets from the packet in the storage area "#1". More specifically, if the mobile terminal 300 receives the packet in the storage area "#2" unsuccessfully, the base station 200 performs the retransmission processing and other processing. After the mobile terminal 300 successfully receives the packet in the storage area "#2", the base station 200 transmits the packet in the storage area "#3". However, the present invention is not limited thereto. The transmission of the packets in the storage areas "#1" to "#6" may be repeated periodically independently of the check on the information ACK/NACK. If the transmission of the packet #2" results in the NACK signal, the packets in the storage areas "#3", "#4", "#5", "#6", and "#1" are transmitted next. Then, the packet in the storage area "#2" may be retransmitted.

[Velocity Information]

For example, according to the second embodiment, the mobile terminal 300 calculates the velocity of travel and transmits the velocity information corresponding to the calculated velocity of travel to the base station 200. However, the present invention is not limited thereto. The mobile terminal 300 may transmit the velocity of travel itself to the base station 200.

For example, not the mobile terminal 300 but the base station 200 may calculate the velocity of travel. For example, when the mobile terminal 300 acquires a GPS signal, the mobile terminal 300 may transmit the acquired GPS signal to the base station 200. The base station 200 may use the received GPS signal to calculate the velocity of travel of the mobile terminal 300.

[Determination using Number of Retransmission Requests]

According to the second embodiment, the reply controller 223 determines whether the velocity of travel by the mobile terminal 300 is higher than a predetermined velocity or not and reduces the preset maximum number of retransmission requests if so. However, the present invention is not limited thereto. The reply controller 223 may further perform determination on the number of performed retransmission requests to determine whether the maximum number of retransmission requests is to be reduced or not.

More specifically, the reply controller 223 may further determine whether the number of times of the reception of the NACK signal for one same packet is higher than a preset maximum number of retransmission requests or not. If the reply controller 223 determines that the mobile terminal 300 is moving at a higher velocity than a predetermined velocity and the NACK signal has been received more times than the maximum number of retransmission requests, the reply controller 223 changes the maximum number of retransmission requests to a lower number of requests.

With reference to FIG. 17, for example, a processing flow by the reply controller 223 will be described. FIG. 17 is a flowchart illustrating a processing flow by a reply controller according to the third embodiment.

Referring to FIG. 17, if the reply controller 223 receives the velocity information (Yes in operation S701), the reply controller 223 determines whether the velocity is higher than a predetermined velocity or not (operation S702) and whether the number of performed retransmission requests is higher than the preset maximum number of retransmission requests or not (operation S703).

If the reply controller 223 determines that the velocity is higher than the predetermined velocity and the number of performed retransmission requests is higher than the preset maximum number of retransmission requests (Yes in operation S702 and Yes in operation S703), the reply controller 223 changes the preset maximum number of retransmission requests to a lower number of requests than the preset maximum number of retransmission requests (operation S704). On the other hand, if the reply controller 223 determines that the velocity is not higher than the predetermined velocity, or if the number of performed retransmission requests is not higher than the preset maximum number of retransmission requests (No in operation S702 or No in operation S703), the reply controller 223 ends the processing without performing any operations.

This allows the determination on whether the preset maximum number of retransmission requests is to be reduced or not in accordance with the radio-wave propagation condition between the base station 200 and the mobile terminal 300. In other words, even while the mobile terminal 300 is moving at a high velocity, the mobile terminal 300 may receive a packet successfully as a result of the repetition of the retransmission processing under some radio-wave propagation conditions. Therefore, the reply controller 223 reduces the maximum number of retransmission requests if the mobile terminal 300 is moving at a high velocity and if errors in the target packet are difficult to correct fully even with the repetition of the retransmission processing.

[Combinations of Embodiments]

The second embodiment includes the method of applying one same maximum number of retransmission requests to different mobile terminals and the method of returning the changed maximum number of retransmission requests after a lapse of a predetermined period of time from the change of the maximum number of retransmission requests. However, the present invention is not limited thereto. For example, either one of the methods may be performed.

[System Configuration]

In the processing according to the aforementioned embodiments, all or a part of the processing described to be performed automatically may be performed manually. Conversely, all or a part of the processing described to be performed manually may be performed automatically. Alternatively, all or a part of the processing described to be performed manually may be performed automatically by a publicly known method. For example, a user using the mobile terminal 300 may manually calculate the velocity of travel and input the result to the mobile terminal 300. The mobile terminal 300 may, without calculating the velocity of travel, transmit the velocity of travel input from the user to the base station 200. The base station 200 may estimate the velocity of travel by the mobile terminal 300 on the basis of the state of the received signal from the mobile terminal 300.

In addition, the information including the processing routines and control routines, specific names, data and parameters (as in FIGS. 1 to 17) herein or in the drawings can be arbitrarily changed unless otherwise indicated. For example, processing for reducing the maximum number of retransmission requests may be added after operation S507 in the processing flow illustrated in FIG. 12 according to the second embodiment.

The illustrated components of the apparatus are functional and conceptual and may not typically required to be physically configured in the illustrated manners. In other words, the specific forms of the distribution/integration of the devices are not limited to the illustrated one, but all or part of them may be functionally or physically distributed or integrated in arbitrary units in accordance with the loads and usages.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication system comprising:
    a base station; and
    a mobile terminal for sequentially sending a plurality of data packets at a designated data transfer rate and information of velocity of the mobile terminal to the base station;
    the base station comprising:
        a receiver for receiving the data packet and the velocity information;
        a transmitter for transmitting a request to the mobile terminal to resend a data packet upon detection of an error in the data packet previously received; and
        a reply controller for setting number of requests to be repetitively sent in accordance with the velocity information and, after the number of requests have been sent, sending command to change the designated data transfer rate to the mobile terminal.

2. The communication system of claim 1, wherein after the number of requests have been sent, the reply controller changes the number of requests in accordance with the velocity information.

3. The communication system of claim 2, further comprising other plurality of mobile terminals, wherein after the reply controller has changed the number of requests, the reply controller applies the changed number of requests to all the mobile terminals.

4. The communication system of claim 2, wherein when a predetermined period of time has passed after changing the number of requests, the reply controller returns the changed number of requests to the preset number of requests.

5. A base station communicating with a mobile terminal for sequentially sending a plurality of data packets at a designated data transfer rate and information of velocity of the mobile terminal to the base station, comprising:
    a receiver for receiving the data packet and the velocity information;
    a transmitter for transmitting a request to the mobile terminal to resend a data packet upon detection of an error in the data packet previously received; and
    a reply controller for setting number of requests to be repetitively sent in accordance with the velocity information and, after the number of requests have been sent, sending command to change the designated data transfer rate to the mobile terminal.

6. The base station of claim 5, wherein after the number of requests have been sent, the reply controller changes the number of requests in accordance with the velocity information.

7. The base station of claim 6, communicating with a plurality of mobile terminals, wherein after the reply controller has changed the number of requests, the reply controller applies the changed number of requests to all the mobile terminals.

8. The base station of claim 6, wherein when a predetermined period of time has passed after changing the number of requests, the reply controller returns the changed number of requests to the preset number of requests.

9. A control method of a base station communicating with a mobile terminal for sequentially sending a plurality of data packets at a designated data transfer rate and information of velocity of the mobile terminal to the base station, comprising:
    receiving the data packet and the velocity information;
    transmitting a request to the mobile terminal to resend a data packet upon detection of an error in the data packet previously received;
    setting number of requests to be repetitively sent in accordance with the velocity information; and
    after the number of requests have been sent, sending command to change the designated data transfer rate to the mobile terminal.

10. The control method of claim 9, which comprising changing the number of requests in accordance with the velocity information after the number of requests have been sent.

11. The control method of claim 10, which comprising returning the changed number of requests to the preset number of requests when a predetermined period of time has passed after changing the number of requests.

* * * * *